US007403964B2

(12) United States Patent
Porten et al.

(10) Patent No.: US 7,403,964 B2

(45) Date of Patent: Jul. 22, 2008

(54) GALOIS FIELD MULTIPLIER ARRAY FOR USE WITHIN A FINITE FIELD ARITHMETIC UNIT

(75) Inventors: Joshua Porten, Palo Alto, CA (US); Won Kim, Union City, CA (US); Scott D. Johnson, Mountain View, CA (US); John R. Nickolls, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 509 days.

(21) Appl. No.: 10/459,988

(22) Filed: Jun. 12, 2003

(65) Prior Publication Data

US 2004/0078410 A1 Apr. 22, 2004

Related U.S. Application Data

(60) Provisional application No. 60/420,236, filed on Oct. 22, 2002.

(51) Int. Cl.
*G06F 15/00* (2006.01)
*H03M 13/00* (2006.01)

(52) U.S. Cl. .................................................... 708/492

(58) Field of Classification Search .................. 708/492
See application file for complete search history.

(56) References Cited

U.S. PATENT DOCUMENTS

| | | | | |
|---|---|---|---|---|
| 4,567,568 | A * | 1/1986 | Inagawa et al. | 708/650 |
| 5,046,037 | A * | 9/1991 | Cognault et al. | 708/492 |
| 5,931,894 | A * | 8/1999 | Wei | 708/492 |
| 6,151,393 | A * | 11/2000 | Jeong | 380/265 |
| 6,606,342 | B1 * | 8/2003 | Banister | 375/130 |
| 6,687,725 | B1 * | 2/2004 | Chen et al. | 708/492 |
| 6,988,118 | B2 * | 1/2006 | Chiou | 708/492 |

* cited by examiner

*Primary Examiner*—Chuong D Ngo
(74) *Attorney, Agent, or Firm*—Garlick Harrison & Markison; Timothy W. Markison; Kevin L. Smith

(57) ABSTRACT

A Galois field multiplier array includes a $1^{st}$ register, a $2^{nd}$ register, a $3^{rd}$ register, and a plurality of multiplier cells. The $1^{st}$ register stores bits of a $1^{st}$ operand. The $2^{nd}$ register stores bits of a $2^{nd}$ operand. The $3^{rd}$ register stores bits of a generating polynomial that corresponds to one of a plurality of applications (e.g., FEC, CRC, Reed Solomon, et cetera). The plurality of multiplier cells is arranged in rows and columns. Each of the multiplier cells outputs a sum and a product and each cell includes five inputs. The $1^{st}$ input receives a preceding cell's multiply output, the $2^{nd}$ input receives at least one bit of the $2^{nd}$ operand, the $3^{rd}$ input receives a preceding cell's sum output, a $4^{th}$ input receives at least one bit of the generating polynomial, and the $5^{th}$ input receives a feedback term from a preceding cell in a preceding row. The multiplier cells in the $1^{st}$ row have the $1^{st}$ input, $3^{rd}$ input, and $5^{th}$ input set to corresponding initialization values in accordance with the $2^{nd}$ operand.

4 Claims, 10 Drawing Sheets processor 10 processor 40 instruction 30 finite field arithmetic unit 12 finite field arithmetic unit 12

GF multiplier array 110 - 116 multiplier cell 142 - 172 feedback module 174-180

GALOIS FIELD MULTIPLIER ARRAY FOR USE WITHIN A FINITE FIELD ARITHMETIC UNIT

CROSS REFERENCE TO RELATED APPLICATIONS

The present U.S. Utility Patent Application claims priority pursuant to 35 U.S.C. § 119(e) to the following U.S. Provisional Patent Applications which are hereby incorporated herein by reference in their entirety and made part of the present U.S. Utility Patent Application for all purposes:

1. U.S. Provisional Application Ser. No. 60/420,236, entitled "Galois Field Arithmetic Unit," filed Oct. 22, 2002, now expired.

BACKGROUND OF THE INVENTION

1. Technical Field of the Invention

This invention relates generally to data communications and more particularly to error detection and correction of such data communications.

2. Description of Related Art

As is known, communication systems include a plurality of communication devices (e.g., modems, cable modems, personal computers, laptops, cellular telephones, radios, telephones, facsimile machines, et cetera) that communicate directly (i.e., point-to-point) or indirectly via communication system infrastructure (e.g., wire line channels, wireless channels, bridges, switches, routers, gateways, servers, et cetera). As is also known, a communication system may include one or more local area networks and/or one or more wide area networks to support at least one of the Internet, cable services (e.g., modem functionality and television), wireless communications systems (e.g., radio, cellular telephones), satellite services, wire line telephone services, digital television, et cetera.

In any type of communication system, information (e.g., voice, audio, video, text, data, et cetera) is transmitted from one communication device to another via the infrastructure. Accordingly, the transmitting communication device prepares the information for transmission to the other device and provides the prepared information to the infrastructure for direct or indirect routing to the receiving communication device. For indirect routing, a piece of infrastructure equipment (e.g., server, router, et cetera) receives prepared information and forwards it to another piece of infrastructure equipment or to the receiving communication device. The prepared information is thus propagated through the infrastructure until it reaches the receiving communication device. Once received, the receiving communication device traverses the processing steps used by the transmitting communication device to prepare the information for transmission to recapture the original information.

As is further known, transmission of information between communication devices is not performed in an ideal environment where the received information exactly matches the transmitted information. In practice, the infrastructure introduces error, which distorts the transmitted information such that the received information does not exactly match the transmitted information. To compensate for the error introduced by the infrastructure, the transmitting communication device includes an encoder, which adds redundancy to the original data to make the original data more unique, and the receiving communication device includes a corresponding decoder, which uses the redundancy information to recover the original data from the received data that includes transmission errors.

In general, the encoder and decoder are employing an error detection and correction technique to reduce the adverse effects of transmission errors. As is known, there are a number of popular error correction techniques. One such technique is generally known as forward error correction (FEC). FEC involves an encoder generating error correction data as a function of the data to be sent and then transmitting the error correction data along with the data. A decoder within the receiving communication device utilizes the error correction data to identify any errors in the original data that may have occurred during transmission. In particular, the decoder uses the error correction data, or redundancy bits, to first determine if any error exists in the original transmitted data. If an error exists, the decoder uses the error correction data to correct the error(s), provided the number of errors are less than the maximum number of correctable errors for the given encoding/decoding scheme.

One particular type of forward error correction is called cyclic redundancy checking (CRC). CRC involves generating redundancy bits by partioning the bit stream of the original data into blocks of data. The blocks of data are processed sequentially, with the data from each block being divided by a polynomial. The remainder from the division process becomes the redundancy bits, which are appended to, and transmitted with, the block of data from which they were generated. The decoder, upon receiving a block of data, divides the block of data and the appended redundancy bits by the same polynomial. If the remainder of this division is zero, there are no errors in the received block of data. If, however, there is a remainder, an error exists. For CRC, when an error exists in the block of data, the decoder typically requests retransmission of the block of data.

Another popular FEC algorithm is called Reed Solomon encoding and decoding. Like CRC, Reed Solomon partitions a data stream into sequential blocks of data and then divides a block of data by a polynomial to obtain parity, or check, data. However, Reed Solomon operates on a byte stream rather than a bit stream, so it creates check bytes, which are appended to each block of data. The decoding process at the receiver is considerably more complex than that of the CRC algorithm. First, a set of syndromes is calculated. If the syndromes have a zero value, the received block of data is deemed to have no errors. If one or more of the syndromes are not zero, the existence of one or more errors is indicated. The non-zero values of the syndrome are then used to determine the location of the errors and, from there, correct values of data can be determined to correct the errors.

Many of the FEC schemes are based on Galois field (GF) arithmetic. For example, CRC is based on GF(2) in processing blocks of single bit data (i.e., the finite field consists of only two values, 0 and 1). Reed Solomon is based on a finite field of $GF(2^8)$, which has elements that can have 256 different values (e.g., zero, 1, $\alpha, \alpha^2, \ldots, \alpha^{254}$). The Reed Solomon operation of dividing blocks of data by a polynomial includes multiply and add operations that are finite field in nature. Due to the unique nature of Galois field arithmetic, Reed Solomon encoders and/or decoders may be implemented using digital signal processors (DSP) and/or microprocessors that include special hardware to perform the requisite Galois field mathematical operations of error correction algorithms.

In particular, Galois field addition can be effectively implemented using an exclusive OR logic function between two elements that are to be added. However, multiplication and division are much more complex. Prior art solutions have employed look-up tables, as the special hardware, to perform GF multiplications using otherwise traditional DSP and microprocessor computational resources. Table look-up operations are very slow and therefore not very desirable, particularly when an application is being performed that requires the error correction operations to be completed in real time on high-speed data.

Therefore, a need exists for a processor that includes a finite field arithmetic unit that is capable of performing multiple finite field arithmetic functions and/or finite field based applications.

BRIEF SUMMARY OF THE INVENTION

The processor including a finite field arithmetic unit of the present invention substantially meets these needs and others. In one embodiment, a processor includes an instruction memory, arithmetic logic unit, finite field arithmetic unit, at least one digital storage device, and an instruction decoder. The instruction memory temporarily stores an instruction that includes at least one of: an operational code, destination information, and source information. The instruction decoder is operably coupled to interpret the instruction to identify the arithmetic logic unit and/or the finite field arithmetic unit to perform the operational code of the corresponding instruction. The instruction decoder then identifies at least one destination location within the digital storage device based on the destination information contained within the corresponding instruction. The instruction decoder then identifies at least one source location within the digital storage device based on the source information of the corresponding instruction. When the finite field arithmetic unit is to perform the operational code, it performs a finite field arithmetic function upon data stored in the at least one source location in accordance with the operational code and provides the resultant to the destination location.

Other embodiments of a processor may include one or more arithmetical logic units and/or one or more finite field arithmetic units. In addition, the instruction may include Galois field arithmetic operational codes to be performed by one or more of the finite field arithmetic units.

The finite field arithmetic unit may include a Galois field arithmetic unit that includes a Galois field multiplier section and a Galois field adder section. The Galois field multiplier section includes a plurality of Galois field multiplier arrays that perform a Galois field multiplication by multiplying, in accordance with a generating polynomial, a $1^{st}$ operand and a $2^{nd}$ operand. The bit size of the $1^{st}$ and $2^{nd}$ operands correspond to the bit size of a processor data path, where each of the Galois field multiplier arrays performs a portion of the Galois field multiplication by multiplying, in accordance with a corresponding portion of the generating polynomial, corresponding portions of the $1^{st}$ and $2^{nd}$ operands. The bit size of the corresponding portions of the $1^{st}$ and $2^{nd}$ operands corresponds to a symbol size of symbols of a coding scheme being implemented by the corresponding processor.

The Galois field adder section includes a plurality of Galois field adders that add the Galois field product with a $3^{rd}$ operand to produce a Galois field multiply and accumulate resultant. The bit size of the $3^{rd}$ operand correlates to the bit size of the processor data path. Each of the Galois field adders adds a corresponding portion of the $3^{rd}$ operand with a corresponding portion of the Galois field product. The bit size of the corresponding portion of the $3^{rd}$ operand and the corresponding portion of the Galois field product correlates to the symbol size.

A Galois field multiplier array may include a $1^{st}$ register, a $2^{nd}$ register, a $3^{rd}$ register, and a plurality of multiplier cells. The $1^{st}$ register stores bits of a $1^{st}$ operand. The $2^{nd}$ register stores bits of a $2^{nd}$ operand. The $3^{rd}$ register stores bits of a generating polynomial that corresponds to one of a plurality of applications (e.g., FEC, CRC, Reed Solomon, et cetera). The plurality of multiplier cells is arranged in rows and columns. Each of the multiplier cells outputs a sum and a product and each cell includes five inputs. The $1^{st}$ input receives a preceding cell's multiply output, the $2^{nd}$ input receives at least one bit of the $2^{nd}$ operand, the $3^{rd}$ input receives a preceding cell's sum output, a $4^{th}$ input receives at least one bit of the generating polynomial, and the $5^{th}$ input receives a feedback term from a preceding cell in a preceding row. The multiplier cells in the $1^{st}$ row have the $1^{st}$ input, $3^{rd}$ input, and $5^{th}$ input set to corresponding initialization values in accordance with the $2^{nd}$ operand. With such a processor, multiple finite field arithmetic applications may be supported including, but not limited to, FEC, CRC, and Reed Solomon encoding and decoding algorithms.

DETAILED DESCRIPTION OF THE INVENTION

Figure 1:
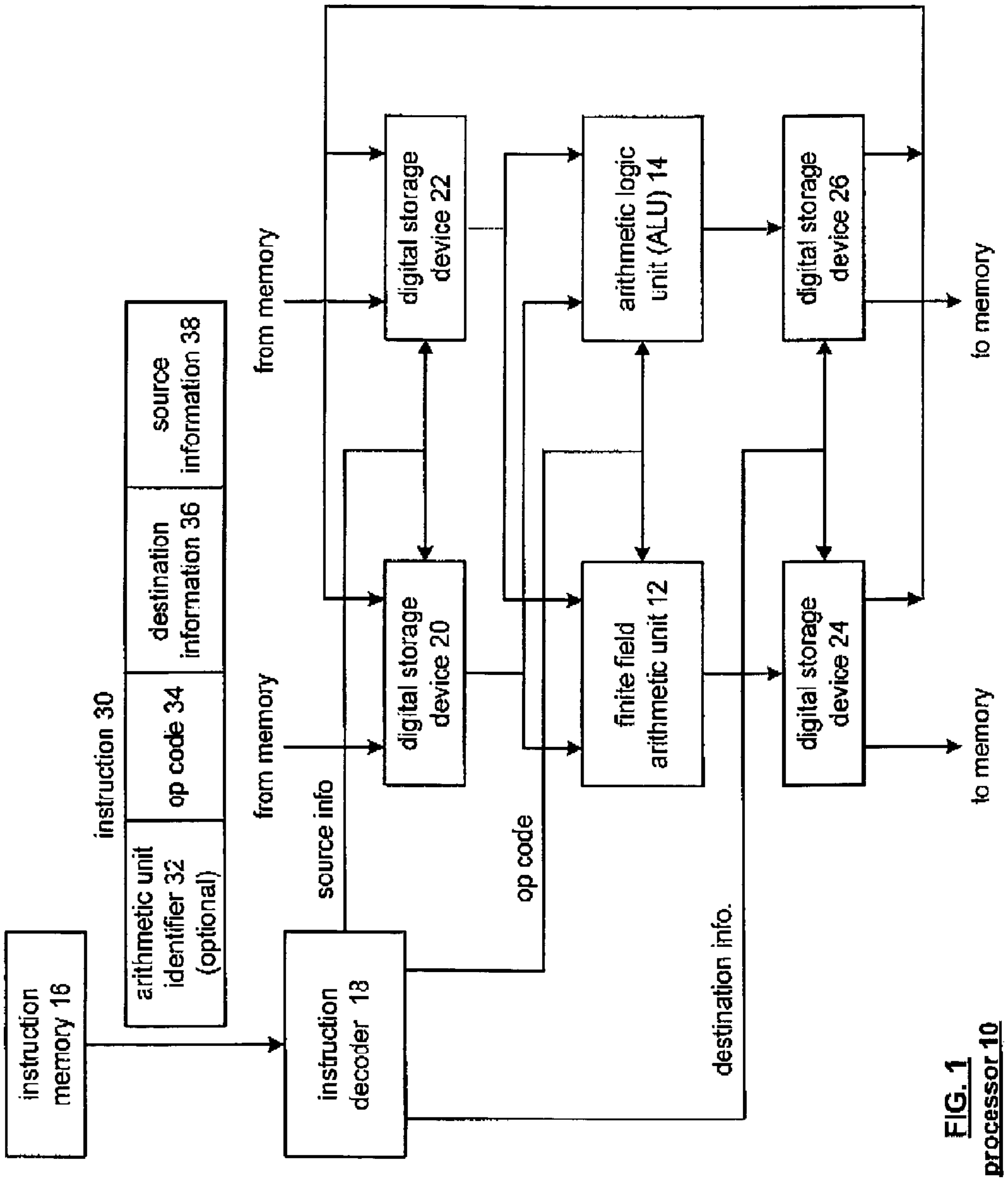
FIG. 1 is a schematic block diagram of a processor in accordance with the present invention.

FIG. 1 is a schematic block diagram of a processor 10 that includes a finite field arithmetic unit 12 an arithmetic logic unit (ALU) 14, an instruction memory 16, an instruction decoder 18, and a plurality of digital storage devices 20-26. The processor 10 may be constructed as an integrated circuit or using discrete components. Further, if constructed as an integrated circuit, the processor 10 may include internal memory and/or a memory interface for coupling with external memory (i.e., memory that is external to the integrated circuit).

In operation, the instruction memory 16, which may be a cache memory, temporarily stores an instruction 30. The instruction 30 includes at least an operational code field 34, a destination information field 36, and a source information field 38; the instruction may also include an arithmetic unit identifying field 32. The arithmetic unit identifier field 32, when present, identifies one or more of the finite field arithmetic unit 12 and arithmetic logic unit 14 to perform a corresponding operational code stored in operational code field 34 upon data stored at locations indicated by the source information. Implementations without an arithmetic unit identifying field 32 use either the operational code field 34 or its position in a wide instruction to identify the arithmetic unit. The destination information field includes one or more addresses, or register IDs, where the resultant from execution of the corresponding operational code is to be stored. The source information field 38 includes one or more addresses, or register IDs, identifying the storage location of the data operands that the operational code is to be executed upon. The instruction 30 will be described in greater detail with reference to FIG. 3.

The instruction decoder 18 receives the instruction 30 and subsequently decodes it. Based on the decoding, the instruction decoder 18 generates source information, which identifies the storage location of the input operands of the corresponding operational code. The instruction decoder 18 also interprets the arithmetic unit identifier field 32, the operational code 34, or its position to identify which of the arithmetic units 12 or 14 is to execute the operational code. Based on this interpretation, the instruction decoder 18 provides the operational code to either the finite field arithmetic unit 12, which may perform Galois field arithmetic functions, or to the arithmetic logic unit 14, which performs binary arithmetic functions, mathematical functions, and logic functions. Further, the instruction decoder 18 interprets the destination information field 36 to determine where the resulting data from the execution of the corresponding operational instruction is to be routed.

If the arithmetic unit identifier 32, the operational code 34, or its position identifies the finite field arithmetic unit 12, the finite field arithmetic unit 12 will retrieve $1^{st}$ and/or $2^{nd}$ operands from digital storage devices 20 and/or 22, which may be registers and/or part of internal memory of processor 10. Upon retrieving the corresponding operands, the finite field arithmetic unit 12 performs the corresponding finite field arithmetic function, as indicated by the operational code, upon the corresponding operand(s) to produce a finite field resultant. The finite field resultant is provided to digital storage device 24, which based on the destination information provided by the instruction decoder 18 routes the resultant to memory or back to one of the input digital storage devices 20 or 22. The memory may be internal to the integrated circuit including processor 10 or it may be external to the integrated circuit. The functionality of the finite field arithmetic unit will be described in greater detail with reference to FIGS. 4-11.

If the arithmetic unit identifier 32, the operational code 34, or its position identifies the arithmetic logic unit 14, the arithmetic logic unit 14 retrieves a $1^{st}$ and/or $2^{nd}$ operand from digital storage devices 20 and/or 22. The arithmetic logic unit 14 then performs the corresponding arithmetic logic function, as indicated by the operational code, upon the $1^{st}$ and/or $2^{nd}$ operands to produce an arithmetic logic resultant. The arithmetic logic resultant is provided to digital storage device 26 for subsequent routing to internal memory, external memory, and/or back to the input digital storage devices 20 or 22 in accordance with the destination information. The output digital storage devices 24 and 26 may be registers, and/or part of internal memory of processor 10.

Figure 2:
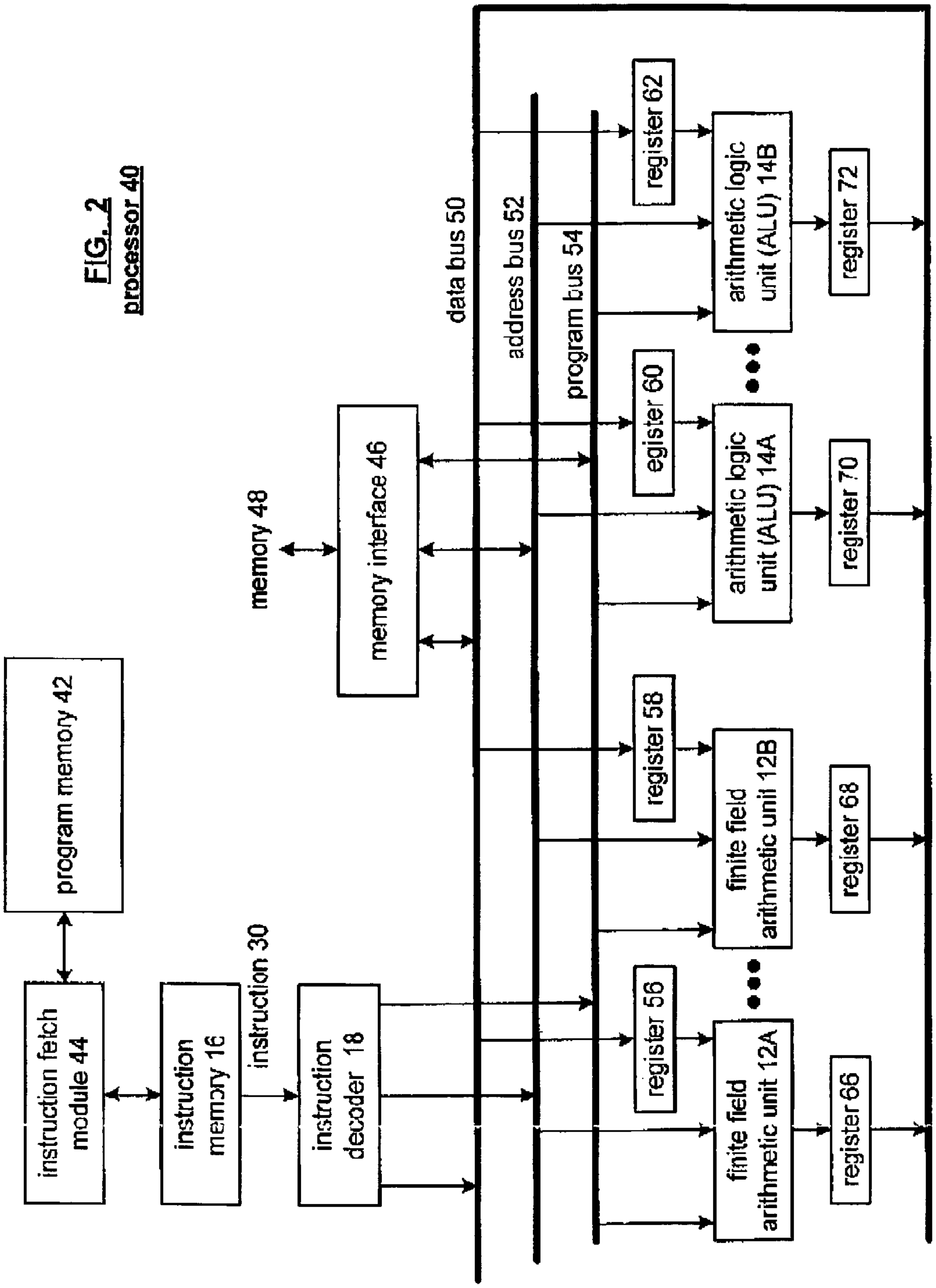
FIG. 2 is a schematic block diagram of an alternate processor in accordance with the present invention.

FIG. 2 is a schematic block diagram of an alternate processor 40 that includes a plurality of finite field arithmetic units 12A-12B, a plurality of arithmetic logic units 14A-14B, program memory 42, instruction fetch module 44, instruction memory 16, instruction decoder 18, memory interface 46, a data bus 50, an address bus 52, a program bus 54, and a plurality of registers 56-72. Registers 56-62 function as input registers for the corresponding finite field arithmetic units and arithmetic logic units. Each of the input registers 56-62 may hold one or more input operands. Each corresponding output register 66-72 may store one or more output resultants from the corresponding finite field arithmetic units and arithmetic logic units.

The program memory 42, which may be a cache memory, stores corresponding operational codes of one or more algorithms. For example, the program memory 42 may store a cyclic redundancy checking (CRC) algorithm and a Reed Solomon encoding and/or decoding algorithm. When processor 40 is executing one of these algorithms, the instruction fetch module 44 fetches one or more instructions of the corresponding algorithm from the program memory 42. The retrieved instruction, or instructions, is provided to the instruction memory 16. The instruction memory 16 provides at least one instruction at a time to the instruction decoder 18. The instruction 30 may include multiple arithmetic unit identifier fields or use multiple positions, multiple corresponding operational code fields, multiple corresponding destination information fields and multiple corresponding source information fields. As such, one instruction may include multiple operational codes and corresponding input and output information for one or more of the arithmetic units 12A, 12B, 14A and 14B. For example, a finite field arithmetic function may be executed in parallel with an arithmetic logic unit function.

The instruction decoder 18 decodes instruction 30 and places the corresponding address information on address bus 52 and the corresponding operational code on program bus 54. Based on this information, the addressed finite field arithmetic unit 12A-12B and/or the addressed arithmetic logic unit 14A-14B retrieves the corresponding input operands from the appropriate input register and/or from memory 48, which may be a cache memory or register array, via memory interface 46. Memory 48 may be internal and/or external to processor 40 with respect to an integrated circuit implementation of processor 40.

Having retrieved the corresponding input operands, the finite field arithmetic unit 12A-12B and/or the arithmetic logic unit 14A-14B performs a corresponding arithmetic function, based on the operational code retrieved from program bus 50, to produce a resultant. The resultant is stored in the corresponding output registers 66-72, which may then be provided to memory 48 via memory interface 46 and/or provided to one of the input registers 56-62.

As one of average skill in the art will appreciate, the processor implementations illustrated in FIG. 1 or 2 or others that may be derived from the teachings with respect to FIGS. 1 and 2 provide a digital signal processor that is readily applicable for use in voice-over-packet systems and/or for digital subscriber loop (DSL) modems. By utilizing such a processor in a DSL modem, voice-over-packet system, or other like applications, look-up tables for performing Reed Solomon encoding/decoding, or other type of error detection and correction schemes, which utilized look-up tables, is avoided. As such, the processors in FIG. 1 and/or FIG. 2 provide a means for performing error detection and correction operations in real time for high-speed data.

Figure 3:
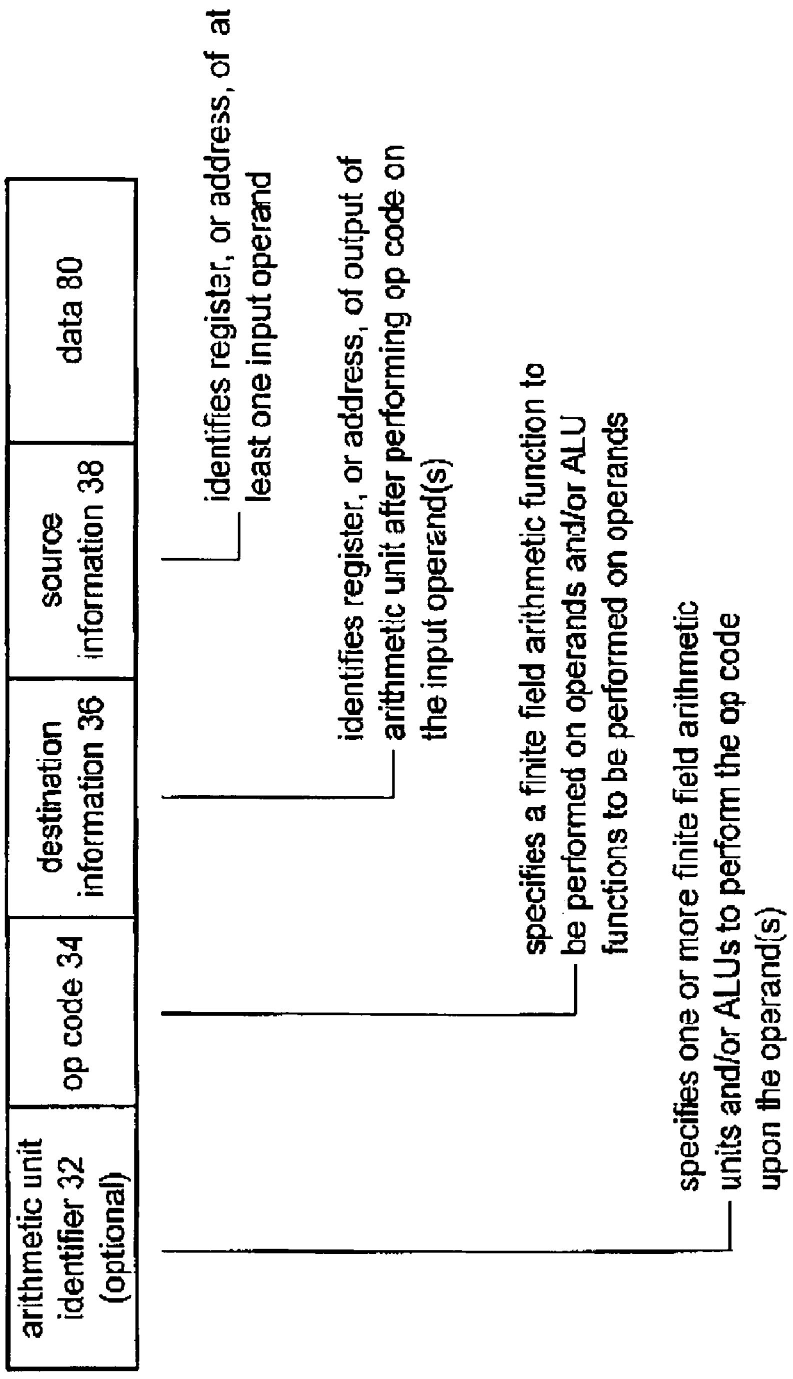
FIG. 3 is a graphical representation of an instruction in accordance with the present invention.

FIG. 3 illustrates a more detailed diagram of instruction 30. As shown, instruction 30 includes the operational code field 34, a destination information field 36, and a source information field 38. Instruction 30 may also include an arithmetic unit identifier field 32 and a data field 80. The arithmetic unit identifier field 32, operational code 34, or its position specifies one or more finite field arithmetic units and/or one or more arithmetic logic units to perform the corresponding operational code, or operational codes, upon the identified operand, or operands. The operational code field 34 specifies a finite field arithmetic function to be performed on the operand(s) and/or an arithmetic logic unit function to be performed on the operand(s).

The operational code field may specify a finite field function that corresponds to a cyclic redundancy check (CRC) instruction having an 8-bit generating polynomial, a CRC instruction having a 16-bit generating polynomial, a CRC instruction having a 32-bit generating polynomial, or a Reed Solomon instruction having a 32-bit generating polynomial for execution by the finite field arithmetic unit. The operational code field may also include a spreading function to spread (or replicate) one or more of the input operands, or input data, a finite field addition function to perform a finite field addition on two operands to produce a finite field sum, a finite field multiplication function to perform a finite field multiplication on a $1^{st}$ operand and a $2^{nd}$ operand to produce a finite field resultant, and/or a finite field multiply and add function to perform a finite field multiplication of a $3^{rd}$ and $4^{th}$ operands to produce a $2^{nd}$ finite field resultant and to perform a finite field addition on the $2^{nd}$ finite field resultant with the $2^{nd}$ finite field resultant to produce a finite field multiply and accumulate resultant.

The operational code field may further include an ALU operational code field that contains an ALU operational code and a finite field arithmetic unit operational code field that contains a finite field operational code. In this instance, the instruction is a very long instructional word (VLIW). The finite field arithmetic function may correspond to a Galois field function.

The destination information field 36 identifies registers, and/or addresses, for storing an output of the arithmetic logic unit or finite field arithmetic unit after the corresponding unit performs the operational code upon the input operand or operands. The source information field 38 identifies registers, and/or addresses, of at least one or the input operands. The source information 38 may also include a generating polynomial field that identifies at least a portion of a generating polynomial. The optional data field 80 may include data that is to be executed upon as one or more of the input operands by the finite field arithmetic unit and/or by the arithmetic logic unit.

Figure 4:
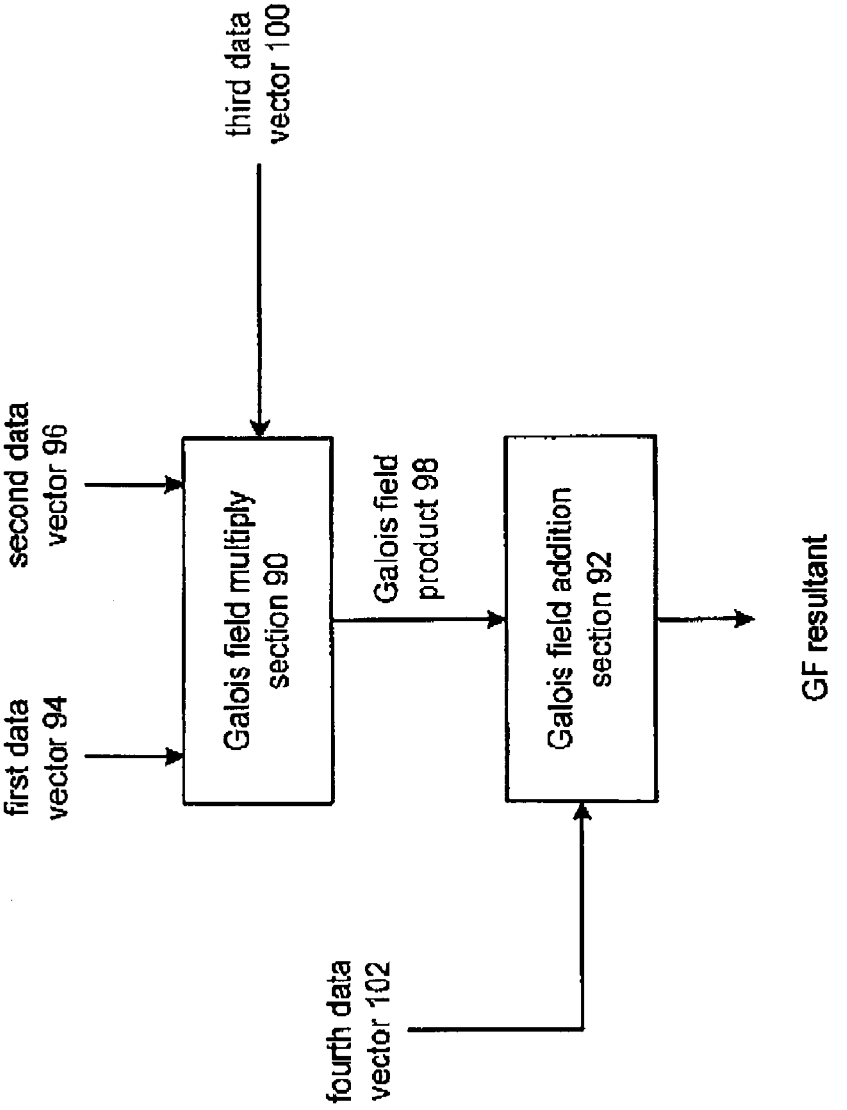
FIG. 4 is a schematic block diagram of a finite field arithmetic unit in accordance with the present invention.

FIG. 4 is a schematic block diagram of a finite field arithmetic unit 12 that includes a Galois field multiply section 90 and a Galois field addition section 92. The Galois field multiply section 90 may be operably coupled to perform a Galois field multiply on a $1^{st}$ data vector 94 and a $2^{nd}$ data vector 96 to produce a Galois field product 90. Alternatively, the Galois field multiply section 90 may perform a Galois field multiply of the $1^{st}$ data vector 90 and $2^{nd}$ data vector 96 in accordance with a $3^{rd}$ data vector 100 to produce the Galois field product 98. Still further, the Galois field multiply section 90 may pass the $1^{st}$ data vector 94, the $2^{nd}$ data vector 96 or the $3^{rd}$ data vector 100 as the Galois field product 98.

The Galois field addition section 92 performs a Galois field addition of the Galois field product 98 with a $4^{th}$ data vector 102 to produce a Galois field resultant. For example, if the finite field arithmetic unit 12 is executing operational codes of a CRC algorithm or Reed Solomon algorithm, the $1^{st}$ and $2^{nd}$ data vectors 94 and 96 may correspond to input operands to the CRC and/or Reed Solomon algorithm, the $3^{rd}$ data vector may correspond to the generating polynomial of the CRC and/or Reed Solomon algorithm and the $4^{th}$ data vector may correspond to a previously calculated value.

Figure 5:
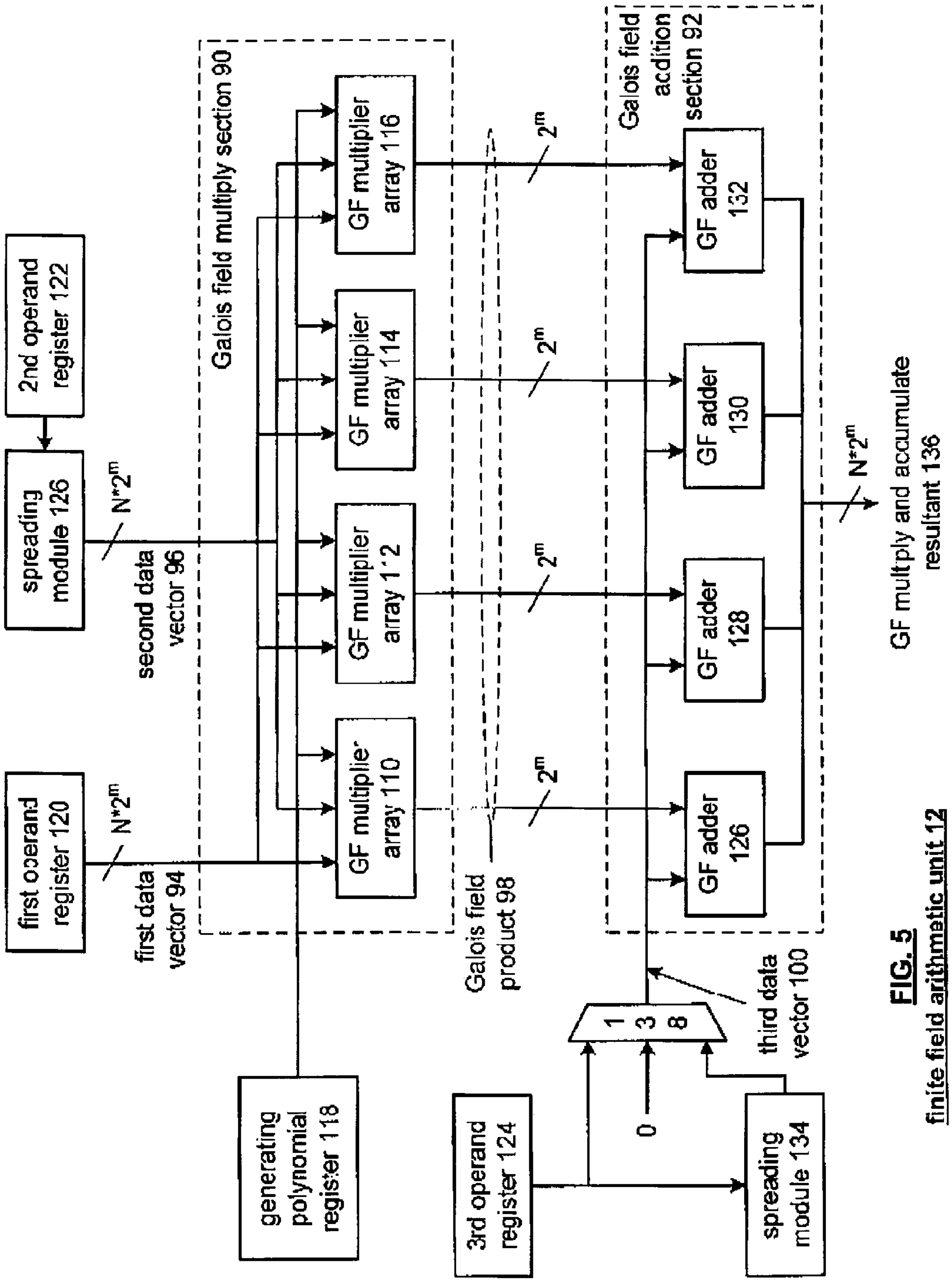
FIG. 5 is a schematic block diagram of an alternate embodiment of a finite field arithmetic unit in accordance with the present invention.

FIG. 5 is a schematic block diagram of an alternate embodiment of the finite field arithmetic unit 12 that includes the Galois field multiply section 90, the Galois field addition section 92, a $1^{st}$ operand register 120, a generating polynomial register 118, a $2^{nd}$ operand register 122, a $3^{rd}$ operand register 124, a $1^{st}$ spreading module 134, and a $2^{nd}$ spreading module 126, and a multiplexer 138. The Galois field multiply section 90 includes a plurality of Galois field multiplier arrays 110-116. The details of the Galois field multiplier array will be described in greater detail with reference to FIGS. 6-8. In general, each Galois field multiplier array 110-116 performs a corresponding portion of a Galois field multiply function of the $1^{st}$ data vector 94 with the $2^{nd}$ data vector 96 in accordance with a corresponding portion of the generating polynomial.

The Galois field addition section 92 includes a plurality of Galois field adders 126-132 which perform a corresponding Galois field addition of its respective inputs to produce a Galois field multiply and accumulate resultant 136. In this embodiment, the finite field arithmetic unit 12 includes 3 input vectors (the $1^{st}$ data vector 94, the $2^{nd}$ data vector 96 and the $3^{rd}$ data vector 100) and a single vector output (i.e., the Galois field multiply and accumulate resultant 136). Each of the input and output vectors consist of N elements, each being $2^m$ bits wide. For example, if the processor is a 32-bit processor, the finite field arithmetic unit 12 will process 32-bit wide input data and implement a Galois field ($2^3$) arithmetic processing, where m=3 and N=4.

Thus, for this example, the Galois field multiplier section 90 will include four 8×8 Galois field multiplier arrays that produce four parallel 8-bit Galois field products. The four 8-bit products may be Galois field added to a $3^{rd}$ input that is also 32-bits wide to produce a 32-bit wide Galois field multiply and accumulate resultant. The generating polynomial register 118 will store four 8-bit generating polynomials that control the four Galois field multiplier arrays. In this example, spreading modules 126 and 134 replicate the least significant 8-bits throughout the 32-bit vector of their corresponding input data vectors 96 and 100. Note that the generating polynomial register 118 is a programmable register that enables configurable Galois field operations for different generating polynomials and for field sizes that are smaller than $2^m$.

Figure 6:
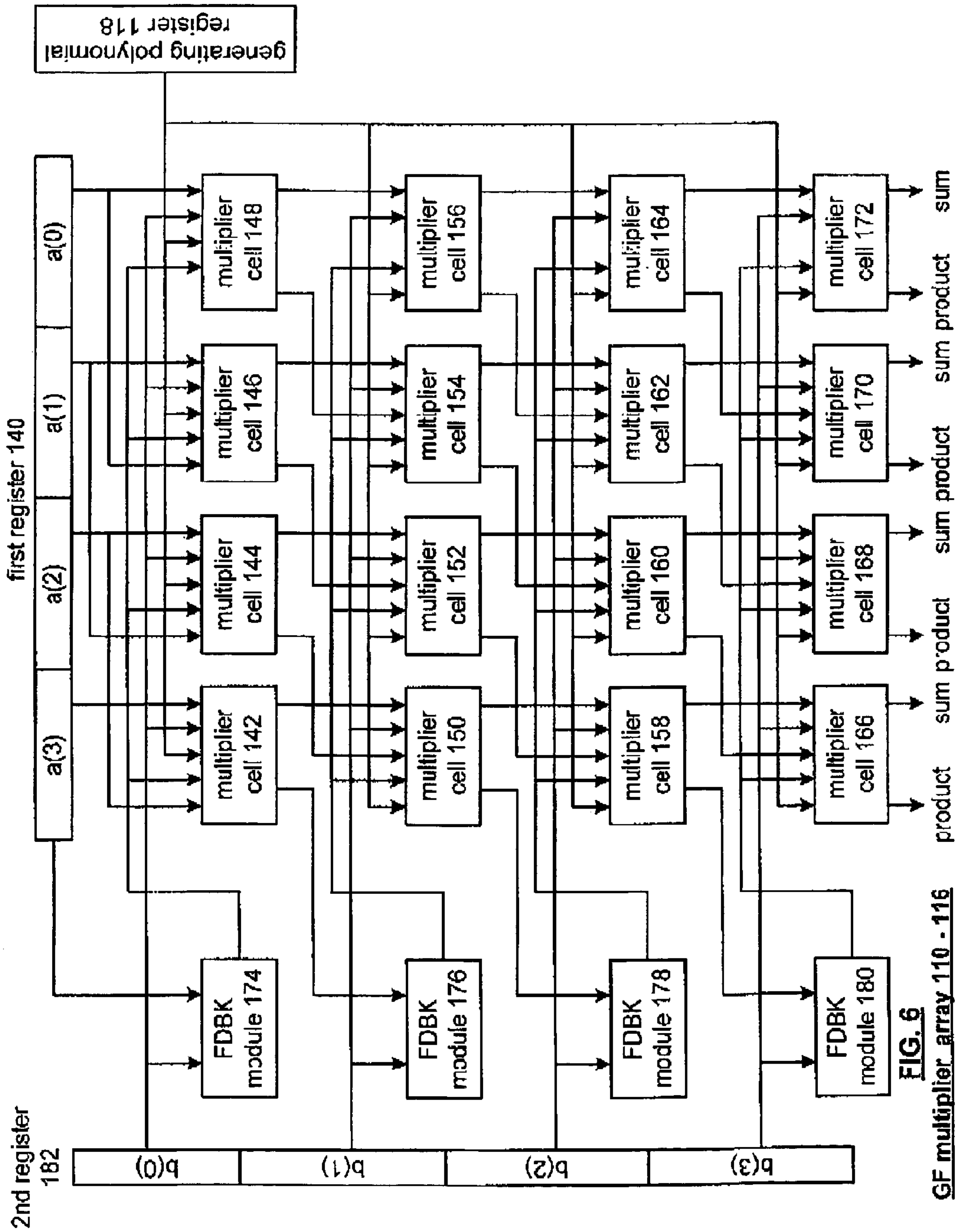
FIG. 6 is a schematic block diagram of a Galois field multiplier array in accordance with the present invention.

FIG. 6 illustrates a schematic block diagram of a Galois field multiplier array 110-116. In this illustration, the Galois field multiplier array includes a 4×4 structure. However, the Galois field multiplier may be configured as a 4×8 structure, an 8×4 structure, an 8×8 structure, an 8×16 structure, a 16×8 structure, a 16×16 structure, et cetera. As shown, the Galois field multiplier array 110-116 includes a $1^{st}$ register 140, a $2^{nd}$ register 182, a plurality of feedback modules 174-180 and a plurality of multiplier cells 142-172. Each multiplier cell 142-172 includes five inputs and two outputs.

In general, the Galois field multiplier array implements Galois field mathematical functions that may be configured to perform a variety of Galois field functions to support, in real time, forward error correction algorithms (e.g., CRC and/or Reed Solomon) on high-speed data. This versatility is at least partially achieved because the Galois field multiplier array is of a square array structure of size $L=2^m$ that includes L rows each row containing L multiplier cells (M(i, j)) and a single feedback cell (FB(i)). The row number is designated by a lower case (i) and the column number or multiplier cell number within a row is designated by a lower case (j), where i and j range from zero to L−1. The array has two data inputs "a" which equals ($a_{L-1}, \ldots, a_1, a_0$) and "b" which equals ($b_{L-1}, \ldots, b_1, b_0$) and two control inputs. The $1^{st}$ set of control inputs comes from the generating polynomial register 118 that holds the generating polynomial GX, which equals $(gx_{L-1}, \ldots, gx_1, gx_0)$. The other control input indicates a CRC operation or non-CRC operation (a Galois field multiply or multiply-add operation).

Each multiplier cell 142-172, based upon its corresponding inputs, produces a sum output [sum(i,j0] and a multiply output [m(i,j)]. For each row but the 1$^{st}$, the inputs to each cell comes from the preceding row and from the 2$^{nd}$ register. The 1row is initialized based on information contained within the 1$^{st}$ and 2$^{nd}$ registers. The data is propagated through the array of multiplying cells to produce the final output via the last row (e.g., cells 166-172 for the example array of FIG. 6).

Figure 7:
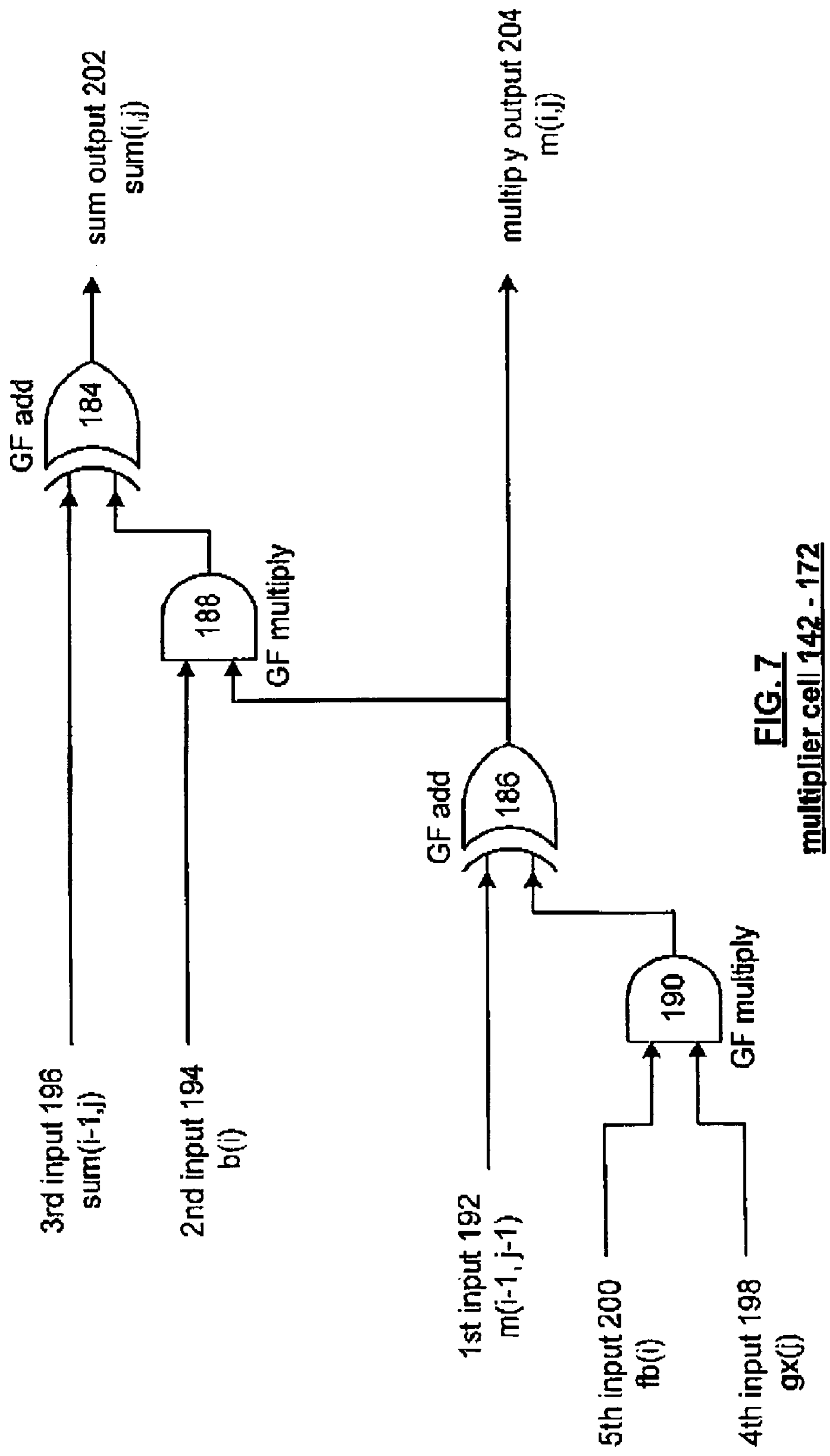
FIG. 7 is a schematic block diagram of a multiplier cell in accordance with the present invention.

FIG. 7 is a schematic block diagram of the multiplying cells 142-172. Each cell includes exclusive OR gate 184, AND gate 188, exclusive OR gate 186, and AND gate 190. The exclusive OR gates 184 and 186 perform a Galois field addition while the AND gates 188 and 190 perform Galois field multiply functions. Each multiplier cell 142-172 includes five inputs, 192-200, or four inputs 194-200 in the rightmost column, and two outputs 202 and 204. The 1$^{st}$ input 192 receives the multiply output m(i−1-j−1) from the multiplier cell in the preceding row and one cell position to the right of the current cell. For example, with reference to FIG. 6, multiplier cell 154 receives the multiply output 204 from multiplier cell 148. If the multiplier cell is in the 1$^{st}$ row, i.e., is multiplier cell 142, 144, 146 or 148, the 1$^{st}$ input 192 is provided by the 1$^{st}$ input register 140. If the multiplier cell is in the rightmost column, i.e., is multiplier cell 148, 156, 164, or 172, the 1$^{st}$ input 192 is zero.

The 2$^{nd}$ input 194 of the multiplier cell receives at least one bit b(i) from the 2$^{nd}$ register 182. For example, with reference to FIG. 6, multiplier cells 142-148 receive the corresponding bit [b(0)] stored in 2$^{nd}$ register 180. Returning to FIG. 7, the 3$^{rd}$ input 196 [sum(i−l,j)] corresponds to the sum produced by the cell in the preceding row and in the same cell position as the current cell. For example, with reference to FIG. 6, multiplier cell 154 receives the sum output from multiplier cell 146. If the cell is in the first row (e.g., cells 142, 144, 146, and 148), the first register 140 provides the third input 196, which may be zero.

The 4$^{th}$ input 198 of the multiplier cell, as shown in FIG. 7, receives the corresponding bit, or bits, of the generating polynomial gx(j). The 5$^{th}$ input 200 of the multiplier cell receives the feedback output [fb(i)] of the feedback cell in the same row. The sum output 202 [sum(i,j)] of the multiplier cell corresponds to a Galois field addition of the 3$^{rd}$ input 196 with a Galois field multiplication of the 2$^{nd}$ input 194 and the multiply output 204. The multiply output 204 [m(i,j)] is a Galois field addition of the 1$^{st}$ input 192 with a Galois field multiply of the 4$^{th}$ and 5$^{th}$ inputs.

Figure 8:
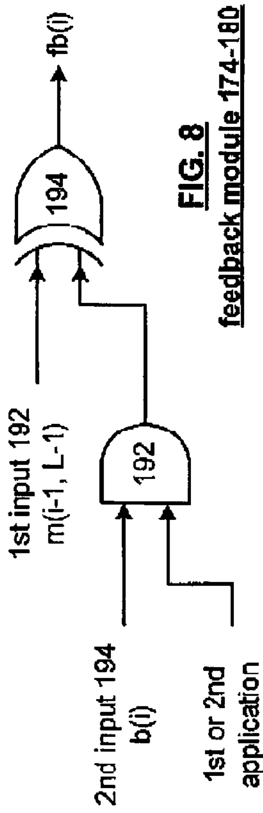
FIG. 8 is a schematic block diagram of a feedback module in accordance with the present invention.

FIG. 8 is a schematic block diagram of the feedback module 174-180. The feedback module includes an exclusive OR gate 194 and an AND gate 192. The feedback module has three inputs and a single output. The three inputs include the 1$^{st}$ input 192 [m(i−1,L−1)], which corresponds to the multiply output of the last multiplier cell in a preceding row, except for the feedback module in the first row, which receives the 1$^{st}$ input from the 1$^{st}$ register 140. For example, feedback module 176, which is in the 2$^{nd}$ row of multiplier cells, receives its 1$^{st}$ input 192 the multiply output of multiplier cell 142 and feedback module 174, which is in the first row, receives its 1$^{st}$ input 192 from the 1$^{st}$ input register 140.

Returning back to FIG. 8, the 2$^{nd}$ input 194 [b(i)] of feedback module 174 receives the correspond bit, or bits, from the 2$^{nd}$ register 182. As shown in FIG. 6, the feedback module 174, which is in the 1$^{st}$ row of multiplier cells, receives bit b(0) while feedback module 176, which is in the 2$^{nd}$ row, receives bit b(1). Returning back to FIG. 8, the 3$^{rd}$ input of the feedback module is an indication of whether a 1$^{st}$ application or 2$^{nd}$ application is to be executed. If the 3$^{rd}$ input is a logic 1, indicating that the 1$^{st}$ application is being executed, the 2$^{nd}$ input 194 is provided to the 2$^{nd}$ input of exclusive OR gate 194. In this instance, the exclusive OR gate 194 is performing a Galois field addition of the 1$^{st}$ input 192 and the 2$^{nd}$ input 194. If, however, the 2$^{nd}$ application is to be used, the 3$^{rd}$ input of the feedback module is zero. As such, the exclusive OR gate 194 passes the 1$^{st}$ input 192 as the feedback output tb(i). For example, the 1$^{st}$ application may correspond to a Reed Solomon encoding and/or decoding function using a Galois field multiply or multiply-add operation, while the 2$^{nd}$ application may correspond to a cyclic redundancy checking (CRC) algorithm.

With reference to FIGS. 4-8, the finite field arithmetic unit 12 may readily perform a CRC function and a Reed Solomon function. As is known, CRC is a cyclic linear block code that is used to add redundancy to a transmitted message. This enables the receiver to detect if any errors were produced during the transmission process. The transmitter constructs the transmitted code word by appending (n−k) CRC bits to a k-bit message and transmitting the n-bits to the receiver. The n−k CRC bits are the remainder of dividing the k-bit message (multiplied by $x^{(n-k)}$) by a generating polynomial of the order of (n−k). The receiver then divides the received code word by the same generating polynomial. If the remainder is zero, no errors exist. If, however, the remainder is not zero, an error exists. The CRC may be done using an 8-bit generating polynomial, a 16-bit generating polynomial, a 32-bit generating polynomial. A CRC with a shorter generating polynomial may be done by appending the polynomial with zeros.

To facilitate a CRC algorithm, the 1$^{st}$ or 2$^{nd}$ application input to the feedback module is asserted in the 2$^{nd}$ application mode to support the CRC functionality. In this mode, the multiplier array, as shown in FIG. 6, is configured to perform a linear feedback shift register (LFSR) to divide the receive code word by the generating polynomial. In general, an LFSR is a serial device that processes one bit at a time. The multiplier array, however, is capable of processing $2^m$ bits in parallel.

The order of the generating polynomial g(x) determines the required width of the Galois field multiplier array (i.e., number of columns j). Thus, a $GF(2^8)$ multiplier requires an 8×8 array. In a similar fashion, a CRC utilizing an 8-bit generating polynomial requires 8 array columns, a CRC using a 16-bit generating polynomial requires 16 array columns, etc. The length of the Galois field multiplier array (i.e., number of rows, i) determines the number of received bits that may be processed (i.e., divided) at a time for CRC calculations. For example, an 8×8 array can process 8 data bits at a time and a 16×8 array can process 16 data bits at a time for a CRC utilizing an 8-bit generating polynomial. Likewise, an 8×16 array can process 8 data bits at a time and a 16×16 array can process 16 data bits at a time for a CRC that utilizes a 16-bit generating polynomial. If, for example, the finite field arithmetic unit includes four 8×8 Galois field multiplier arrays, the four arrays may be used to calculate four independent CRC operations when an 8-bit generating polynomial is used. Alternatively, the four arrays may be cascaded together to provide two CRC calculations utilizing 16-bit generating polynomials or one operation for CRC utilizing a 32-bit generating polynomial.

The generating polynomial register 118 may be programmed with either four independent 8-bit polynomials for CRC utilizing 8-bit generating polynomials, two independent 16-bit polynomials for a CRC calculation utilizing 16-bit generating polynomials, or a single 32-bit polynomial for a CRC operation utilizing a 32-bit generating polynomial. As one of average skill in the art will appreciate, an ixj Galois field multiplier array may also be used to calculate shorter CRCs of up to j bits by appending zeros to the generating polynomial G(x). For example, an 8×8 Galois field multiplier array may be used for a CRC operation that utilizes a 5-bit generating polynomial by appending 3-bits of zero to the generating polynomial G(x) before writing it into the register 118.

To program the processor, and in particular to enable the finite field arithmetic unit 12 to perform the corresponding Galois field and CRC functions, special instructions are created. Such instructions include, for 32-bit input operands "a", "b", and "c" and a 32-bit destination operand "dest":

| Syntax | Description |
|---|---|
| b.sprd8<br>c. sprd8 | The optional .sprd8 suffix spreads the selected input operand by replicating the least significant 8 bits throughout the 32-bit word. |
| gfm.u8m dest, a, b[.sprd8] | This instruction provides a parallel Galois field multiply between input operand "a" and optionally spread input operand "b" with the GF generating polynomial in gx. The vector multiplication uses four 8-bit lanes, i.e., each 8-bits of "a" is GF multiplied by its corresponding 8-bits in "b". The suffix .u8m specifies parallel, unsigned 8-bit operations. |
| gfma.u8m dest, "a", b[.sprd8], c[.sprd8] | This instruction provides a Galois field add, or parallel exclusive OR, between "c" and the Galois field product of "a" and "b". It is called a Galois field multiply-add. |

Using the same finite field arithmetic unit 12, a CRC instruction may be created for CRC operations that utilize an 8-bit generating polynomial, 16-bit generating polynomial, and a 32-bit generating polynomial. Such CRC instructions include:

| Syntax | Description |
|---|---|
| crc.u8m dest, a, b | The instruction provides four parallel CRC8 operations on four 8-bit lanes. Each lane's CRC8 operation is independently defined by the corresponding 8-bit generating polynomial in GX. The CRC8 operation is equivalent to shifting in the 8 bits of the second operand "b" (LSB first) into a LFSR that is initialized by the 8 bits of the first operand "a". The LFSR contents are then presented on the corresponding 8 bits of the destination "dest". |
| crc.u16m dest, a, b | The instruction provides two parallel CRC16 operations on two 16-bit lanes. Each lane's CRC16 operation is independently defined by the corresponding 16-bit generating polynomial in GX. The CRC16 operation is equivalent to shifting in the 8 bits of the second operand "b" (LSB first) into a LFSR that is initialized by the 16 bits of the first operand "a". The LFSR contents are then presented on the corresponding 16 bits of the destination "dest". |
| crc.u32m dest, a, b | The instruction provides a single CRC32 operation on a single 32-bit lane. The CRC32 operation is equivalent to shifting in the 8 bits of the second operand "b" (LSB first) into a LFSR that is initialized by the 32 bits of the first operand "a". The LFSR contents are then presented on the corresponding 32 bits of the destination "dest". |

With further reference to FIGS. 4-8, the finite field arithmetic unit 12 may also be configured to perform a Reed Solomon or Galois field multiply function. In this instance, the $1^{st}$ or $2^{nd}$ application input to the feedback module is asserted in the $1^{st}$ application mode to support the Reed Solomon functionality. As in known, Reed Solomon encoding is similar to CRC encoding, in that, an input stream is divided by a generating polynomial and the remainder is appended as parity (or check) bytes. Further, a linear feedback shift register (LFSR) may carry out the division. However, Reed 10 Solomon is a non-binary code, meaning that it's symbols are taken from $GF(2^8)$ and not GF(2) as is done for CRC. In other words, the symbols are 8-bits wide not 1-bit wide and therefore, the LFSR data path for Reed Solomon is 8-bits wide and the feedback term is GF multiplied by a set of coefficients $C_i(x)$, where each coefficient is an 8-bit element from $GF(2^8)$. As such, the LFSR will have 2t stages of 8-bit registers where "t" is the number of check bytes that the Reed Solomon code is able to correct.

For Reed Solomon encoding, an 8-bit feedback term is calculated and GF multiplied with 2t coefficients $C_i(x)$ (i.e., the 1st input that is stored in the 1st operand register 120 of FIG. 5) for each new input data byte in the $2^{nd}$ operand register 122. The 8-bit products are then added to the previous 8-bit register values 124 and written back to the LFSR, shifted one location to the right. This may be summarized as follows:

```
for (i=0; i<sizeof__RS__packet; i++)              // outer loop
 {
  calculate__feedback__term;                       // inner loop
  for (j=0; j<2t/4);j++)
   calculate__and__store__new__LFSR__values;       //4 registers may be
 }                                                 processed per cycle
```

Such vector multiply and add operations provide an efficient means to accelerate Reed Solomon encoding. The following illustrates an example of $GF(2^3)$ Reed Solomon encoding.

Let:

2t=16

$GX_0$ be the 8-bit $GF(2^3)$ generating polynomial;

$B_{15} \ldots B_0$ be the LFSR's 8-bit registers;

$C_{15} \ldots C_0$ be the Reed Solomon, fixed 8-bit, coefficients; and $FB=B_{15}$ ^ data_in be the 8-bit feedback term of the LFSR, calculated (in parallel) by the ALU.

The data block is an ordered byte array (i.e., data_in[block_length]), where block_length is the number of samples in the data block.

The LFSR registers are stored in the following order:

B12, B13, B14, B15
B8, B9, B10, B11
B4, B5, B6, B7
B0, B1, B2, B3

The Reed Solomon coefficients are similarly ordered:

C12, C13, C14, C15
C8, C9, C10, C11
C4, C5, C6, C7
C0, C1, C2, C3

Note that each group of four 8-bit LFSR registers or Reed Solomon coefficients are located in a single 32-bit register (or memory location).

Based on the above, the following is an example of the inner loop of 2t=16 encoding routine.

```
GX = [GX0, GX0, GX0, GX0]          //program generating polynomial
                                   register GX for GF(2^3) operation
FB = B15 ^ data_in[0]
for (i=1; i<=block_length; i++) {
gfma.u8m[B12, B13, B14, B15],[C12, C13, C14, C15],
FB.sprd8, [B11, B12, B13, B14]
gfma.u8m[B8, B9, B10, B11],[C8, C9, C10, C11],
FB.sprd8, [B7, B8, B9, B10]
gfma.u8m[B4, B5, B6, B7],[C4, C5, C6, C7], FB.sprd8, [B3, B4, B5, B6]
gfma.u8m[B0, B1, B2, B3],[C0, C1, C2, C3], FB.sprd8, [0, B0, B1, B2]
    FB = B15 ^ data_in[i]
}
```

For Reed Solomon decoding, a syndrome of the receive block is computed. If 1 to "t" errors are detected, then an error location polynomial is determined. Next, the error locations are found by solving the location polynomial. The final stage of Reed Solomon decoding calculates the error values by evaluating a rational function of the error locations. Once the error locations and values are known, the transmitted message may be determined. As is known, the most computational demanding part of the decoding process is the syndrome calculation. A "t" correcting code will have 2t syndromes, named $S_i$ for "i" ranging from 1 to 2t. $S_i$ is the remainder of dividing the received polynomial (data block) R(x) by $(x+\alpha^i)$, where a is a primitive field element of $GF(2^m)$. This may be accomplished by a single stage LFSR. The syndrome calculations may utilize the gfma.u8m instructions when calculating the 2T syndromes. In this case, the processing time for calculating 2t syndromes is block_length×(2×T/4) cycles.

An example operational instruction set for a Reed Solomon decoding function is as follows:

Let:

2t=16

$GX_0$ be the 8-bit $GF(2^3)$ generating polynomial;

$B_{15} \ldots B_0$ be the 16 8-bit registers that are used to calculate the 16 syndromes; and $C_{15} \ldots C_0$ be the fixed 8-bit, Reed Solomon generating polynomial roots (i.e., $\alpha^i$); and The data block is an ordered byte array (i.e., data_in[block_length]) in RF2, where block_length is the number of samples in the data block.

The syndrome registers are stored in the following order:

B12, B13, B14, B15

B8, B9, B10, B11

B4, B5, B6, B7

B0, B1, B2, B3

The Reed Solomon generating polynomial roots are similarly ordered:

C12, C13, C14, C15

C8, C9, C10, C11

C4, C5, C6, C7

C0, C1, C2, C3

Note that each group of four 8-bit syndrome registers or Reed Solomon generating polynomial roots are located in a single 32-bit register (or memory location).

Based on the above, the following is an example of the inner loop of 2t=16 syndrome calculation routine.

```
GX = [GX0, GX0, GX0, GX0]          //program generating polynomial
                                   register GX for GF(2^3) operation
for (i=1; i<=block_length; i++) {
gfma.u8m[B12, B13, B14, B15],[C12, C13, C14, C15],
[B12, B13, B14, B15], data_in(i).sprd8
gfma.u8m[B8, B9, B10, B11],[C8, C9, C10, C11], [B8, B9, B10, B11],
data_in(i).sprd8
gfma.u8m[B4, B5, B6, B7],[C4, C5, C6, C7], [B4, B5, B6, B7],
data_in(i).sprd8
gfma.u8m[B0, B1 B2, B3],[C0, C1, C2, C3,], [B0, B1, B2, B3],
data _in(i).sprd8
}
```

Figure 9:
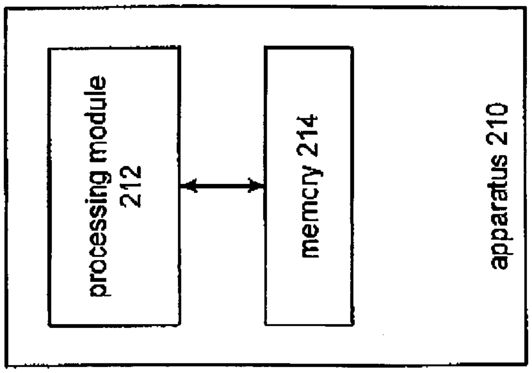
FIG. 9 is a schematic block diagram of an apparatus for processing an instruction in accordance with the present invention.

FIG. 9 is a schematic block diagram of a processing apparatus 210 that includes a processing module 212 and memory 214. The processing module 212 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 214 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 212 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 214 stores, and the processing module 212 executes, operational instructions corresponding to at least some of the steps and/or functions illustrated in FIGS. 10 and 11.

Figure 10:
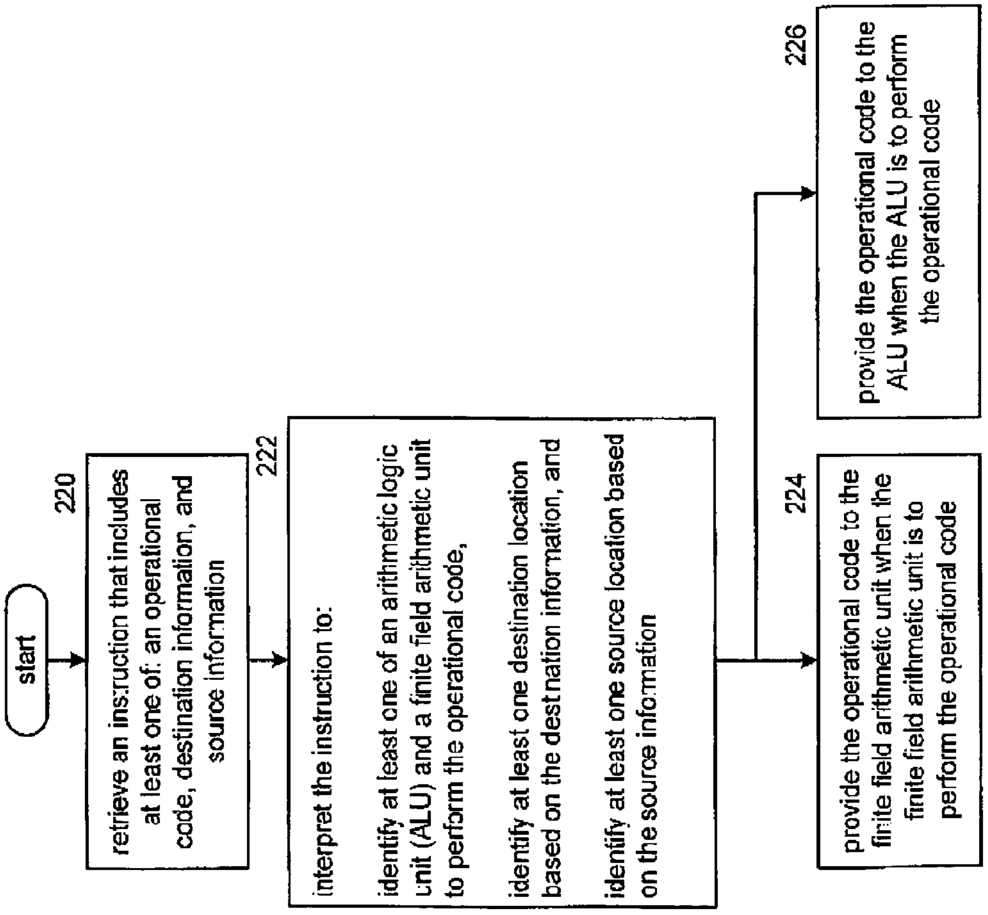
FIG. 10 is a logic diagram of a method for processing an instruction in accordance with the present invention.

FIG. 10 is a logic diagram of a method for processing an instruction. The method begins at Step 220 where an instruction that includes at least one of an operational code, destination information, and source information is retrieved. The instruction may further include a cyclic redundancy check instruction having an 8-bit generating polynomial, a destination, a 1st source, and a 2nd source, wherein the data at the 2nd source is spread corresponding to a bit size of the data at the 1st source, and where the data at the 1st source corresponds to current contents of a CRC execution. The data at the 2nd source corresponds to the input data. Alternatively, the instruction may correspond to a CRC instruction having a 16-bit generating polynomial, a destination, a 1st source and a 2nd source. Still further, the instruction may correspond to a CRC instruction having a 32-bit generating polynomial, the destination, the 1st source and the 2nd source. Yet further, the instruction may correspond to a Reed Solomon or Galois field multiply or multiply-add instruction having up to four 8-bit or a 32-bit generating polynomial. The instruction may further include a spreading function to spread the input data, a finite field addition function to perform a finite field addition on two operands to produce a finite field sum, a finite field multiply function to perform a finite field multiplication on a 1st operand and a 2nd operand to produce a finite field resultant, and/or a finite field multiply and add function to perform a finite field multiplication of a 3rd and 4operands to produce a 2nd finite field resultant and to perform a finite field addition on the $2^{nd}$ finite field resultant to produce a finite field multiply and accumulate resultant. Even further, the instruction may include a $1^{st}$ operational code for execution by the ALU and a $2^{nd}$ operational code for execution by the finite field arithmetic unit.

The process then proceeds to Step 222 where the instruction is interpreted to identify at )east one of the arithmetic logic unit and a finite field arithmetic unit to perform the operational code, to identify at least one destination location based on the destination information, and to identify at least one source location based on the source information. This may further include interpreting the instruction to identify a $2^{nd}$ ALU and providing the operational code to the $2^{nd}$ ALU when it is to perform the operational code. Further, the interpreting the instruction may include interpreting the instruction to identify a $2^{nd}$ finite field arithmetic unit and providing the operational code to the $2^{nd}$ finite field arithmetic unit when it is to perform the operational code.

The process then proceeds to Step 224 and/or 226. At Step 224, the operational code is provided to the finite field arithmetic unit when it is to perform the operational code. The finite field arithmetic unit may perform Galois field arithmetic functions. At Step 226, the operational code is provided to the ALU when the ALU is to perform the operational code.

Figure 11:
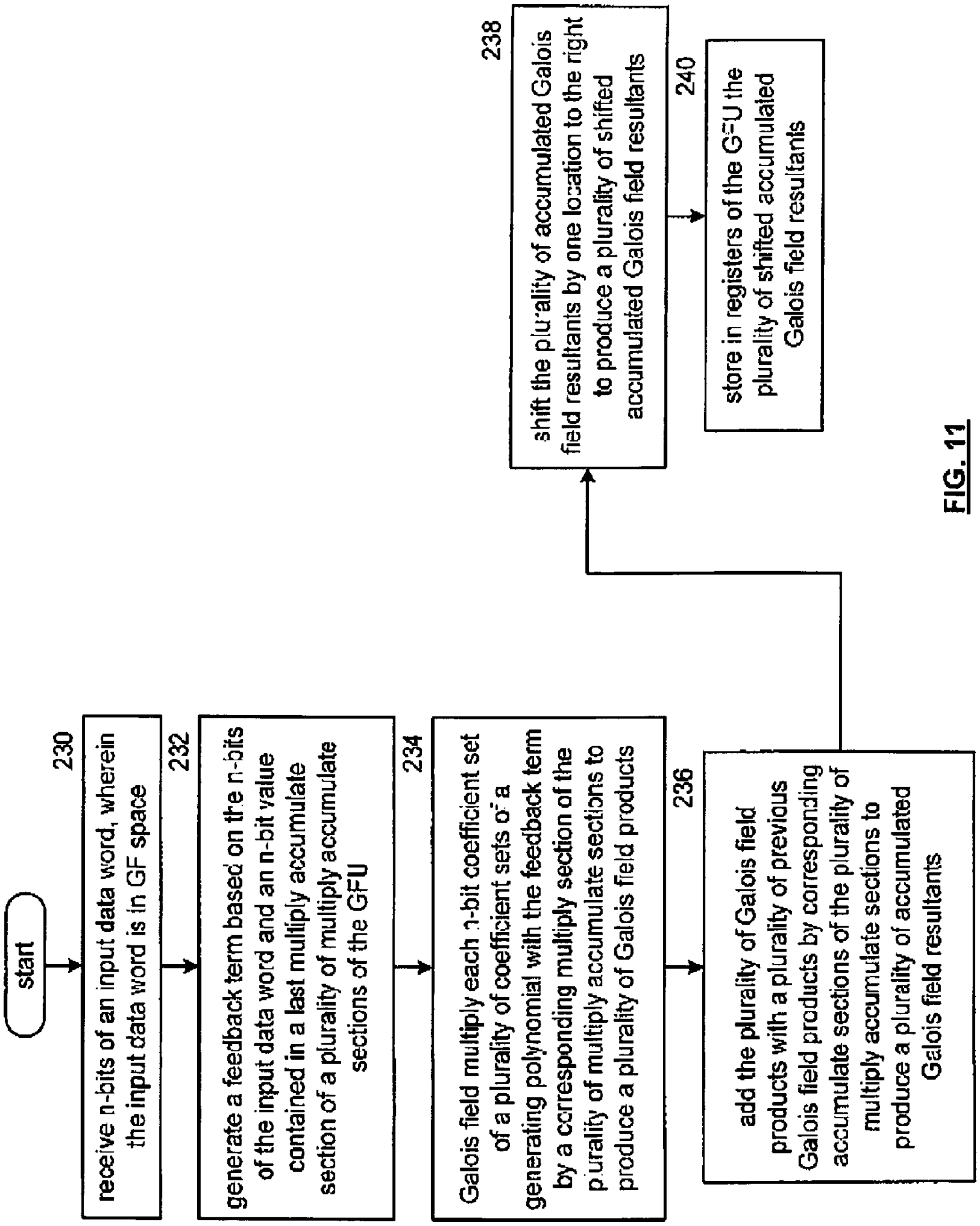
FIG. 11 is a logic diagram of a method for performing encoding by a Galois field arithmetic unit in accordance with the present invention.

FIG. 11 is a logic diagram of a method for performing encoding by a Galois field arithmetic unit. The process begins at Step 230 where N bits of an input data word are received. The input data word is in Galois field space where N corresponds to $2^m$. The process then proceeds to Step 232 where a feedback term is generated based on the N bits of the input data word and an N bit value contained in a last multiply accumulate section of a plurality of multiply accumulates sections of the Galois field arithmetic unit. The feedback term, in one embodiment, may be generated by performing a Galois field addition on the N bits of the input data word with the N bit value contained in the last multiply accumulate section. In another embodiment, the feedback term may be generated by performing an exclusive OR function on the N bits of the input data word with the N bit value contained in the last multiply section of the Galois field arithmetic unit.

The process then proceeds to Step 234 where each N bit coefficient set of a plurality of coefficient sets of a generating polynomial are Galois field multiplied with the feedback term that a corresponding multiply section of the plurality of multiply accumulate sections to produce a plurality of Galois field products. The process then proceeds to Step 236 where the plurality of Galois field products are added with a plurality of previous Galois field products by corresponding accumulating sections of the plurality of multiply accumulates sections to produce a plurality of accumulated Galois field resultants.

The process then proceeds to Step 238 where the plurality of accumulating Galois field resultants are shifted by one location to the right to produce a plurality of shifted accumulated Galois field resultants. The process then proceeds to Step 240 where the plurality of shifted accumulated Galois field resultants are stored in a register of the Galois field arithmetic unit.

The preceding discussion has presented a processing module that includes one or more finite field arithmetic units. Such a processor is readily adept at performing error detection and correction algorithms such as CRC, Reed Solomon and/or any other type of forward error correction algorithms. As one of average skill in the art will appreciate, other embodiments may be derived from the teachings of the present invention without deviating from the scope of the claims.

What is claimed is:

1. A Galois field multiplier array for diverse applications, the Galois field multiplier array comprises:
- first register for storing bits of first operand;
- second register for storing bits a second operand;
- third register for storing a generating polynomial corresponding to one of the diverse applications; and
- a plurality of multiplier cells arranged in a plurality of rows and columns, wherein each of the plurality of multiplier cells outputs a sum and a product, wherein each of the plurality of multiplier cells includes a first input for receiving a preceding cell product value, a second input for receiving at least one bit of the second operand, a third input for receiving a preceding cell sum value, a fourth input for receiving at least one bit of the generating polynomial, and a fifth input for receiving a feedback term from a preceding cell, wherein multiplier cells of the plurality of multiplier cells in a first row of the plurality of rows is initialized based on information contained within the first and second registers, and wherein at least one of the sum outputs and product outputs of multiplier cells of the plurality of multipliers cells in a last row of the plurality of rows provides an output of the Galois field multiplier array for the one of the diverse applications.

2. The Galois field multiplier array of claim 1 further comprises:
- a plurality of feedback modules operably coupled to the rows of the plurality of multiplier cells, wherein, for a first application of the diverse applications, each of the plurality of feedback modules provides a Galois field addition as the feedback term to at least one of the plurality of multiplier cells in a subsequent row, and wherein, for a second application of the diverse applications, each of the plurality of feedback modules provides the output of one of the plurality of feedback modules in a corresponding row as the feedback term to at least one of the plurality of multiplier cells in a subsequent row.

3. The Galois field multiplier array of claim 2, wherein each of the plurality of feedback modules further comprises:
- application enable logic circuitry to enable the first application or the second application, wherein, when the first application is enabled, the application enable logic circuitry outputs at least one bit of the second operand and when the second application is enabled, the application enable logic circuitry outputs a logic zero; and
- Galois field addition module operably coupled to perform a Galois field addition of the output of the application enable logic circuitry with at least one bit of the product output of one of the plurality of multiplier cells in a preceding row.

4. The Galois field multiplier array of claim 1, wherein each of the plurality of multiplier cell further comprises:
- first Galois field addition module, wherein a first input of the first Galois field addition module provides the first input of the multiplier cell, and wherein an output of the first Galois field addition module provides the product output of the multiplier cell;
- second Galois field addition module, wherein a first input of the second Galois field addition module provides the third input of the multiplier cell, and wherein an output of the second Galois field addition module receives the sum output of the multiplier cell;
- first logic circuitry, wherein a first input of the first logic circuitry provides the fourth input of the multiplier cell and a second input of the second logic circuitry provides the fifth input of the multiplier cell, and wherein an output of the first logic circuitry is provided to a second input of the first Galois field addition module; and second logic circuitry, wherein a first input of the second logic circuitry receives the output of the first Galois field addition module and second input of the second logic circuitry provides the second input of the multiplier cell, and wherein an output of the second logic circuitry is provided to a second input of the second Galois field addition module.

* * * * *